United States Patent [19]

Kunii et al.

[11] Patent Number: 4,686,590
[45] Date of Patent: Aug. 11, 1987

[54] APPARATUS FOR POSITIONING A MAGNETIC HEAD

[75] Inventors: Shinpei Kunii, Ohme; Masao Fujiki, Tachikawa, both of Japan

[73] Assignee: Kabushiki Kaisha Toshiba, Kawasaki, Japan

[21] Appl. No.: 749,726

[22] Filed: Jun. 28, 1985

[30] Foreign Application Priority Data

Jun. 29, 1984 [JP] Japan .................. 59-134380

[51] Int. Cl.$^4$ ............ G11B 21/08; G11B 21/02
[52] U.S. Cl. ................................ 360/78; 360/75
[58] Field of Search .............. 360/69, 75, 77, 78, 360/97-99, 105, 106, 137

[56] References Cited

U.S. PATENT DOCUMENTS

| | | | |
|---|---|---|---|
| 3,956,766 | 5/1976 | Hanson et al. | 360/78 |
| 4,134,138 | 1/1979 | Cardot et al. | 360/39 |
| 4,155,105 | 5/1979 | Braun | 360/51 |
| 4,394,696 | 7/1983 | Yoshimaru | 360/78 |
| 4,563,712 | 1/1986 | Nishio et al. | 360/75 |

FOREIGN PATENT DOCUMENTS

| | | | |
|---|---|---|---|
| 0126371 | 11/1984 | European Pat. Off. | 360/75 |
| 0123849 | 11/1984 | European Pat. Off. | 360/106 |
| 2808374 | 8/1978 | Fed. Rep. of Germany | |
| 2847105 | 8/1979 | Fed. Rep. of Germany | |
| 57-167171 | 10/1982 | Japan | 360/97 |

*Primary Examiner*—Raymond F. Cardillo
*Assistant Examiner*—Steven R. Garland
*Attorney, Agent, or Firm*—Finnegan, Henderson, Farabow, Garrett & Dunner

[57] ABSTRACT

An apparatus, primarily for use in battery-powered floppy disk drives, for moving a magnetic head radially toward a reference track in accordance with a direction signal from a disk controller. The apparatus comprises a track position sensor for sensing the track position of the magnetic head. The track sensor outputs a signal indicating whether the magnetic head is positioned radially inward or outward of track positions within a predetermined vicinity of a magnetic disk reference track. The apparatus has a reset circuit for generating a set signal when a power is applied to the reset circuit, and a logic circuit responsive to the track sensor output and set signal for providing a first binary control signal for use in selecting the direction of movement of said magnetic head. A second logic circuit utilizes the first binary control signal and the direction signal from the disk controller to provide a second binary control signal operative to set the direction of movement of the magnetic head. The direction of movement is set in accordance with the direction signal when the first binary control signal is in a first state and in accordance with a predetermined direction when the first binary control signal is in a second state. A moving mechanism moves the magnetic head in accordance with the second binary control signal.

4 Claims, 4 Drawing Figures

APPARATUS FOR POSITIONING A MAGNETIC HEAD

BACKGROUND OF THE INVENTION

I. Field of the Invention

The present invention relates to a magnetic recording and/or reproducing apparatus, and more specifically to apparatus for returning the magnetic head of the recording and/or reproducing apparatus to the zero track position of a magnetic disk.

II. Background Information

Magnetic recording and/or reproducing apparatus, for magnetic flexible (floppy) disks or magnetic diskettes (which hereinafter will also be referred to as floppy disks) which have been used as external data storage devices for information equipment are provided with a stop element called a "stopper" for mechanically preventing a magnetic head used in transferring data between information equipment and magnetic disks from moving in a radially outward direction beyond a reference or zero track (the track of a disk which is the outermost track radially within an available range).

Conventional magnetic recording and/or reproducing apparatus include a flexible disk controller and a flexible disk drive (or drives). The flexible disk controller (FDC) controls the flexible disk drive (FDD) which initially sets the position of a magnetic head of the FDD radially inside of the zero track position of a disk. After the apparatus is powered on, and prior to the transfer of data, an operation is performed allowing the magnetic head to move radially outward in response to a command signal. The magnetic head is thereby moved (actually, returned) to the zero track position of the disk.

The FDD receives the command for moving the magnetic head from the FDC. The FDD operates in the manner described below.

A control circuit (e.g., a microprocessor) for controlling mechanical and electrical systems of internal units assembled in the FDD operates, after the apparatus is powered on, to move a carriage on which the magnetic head is mounted to the zero track position of the disks of the FDD.

In the event that the initial position of the magnetic head is actually located radially outward of the zero track position for any reason, the following will occur.

Since, as shown in FIG. 4, output from a track zero position sensor and an excitation condition of a stepping motor in regard to the minus four (−4) track position (the −4 track being a disk track radially outward of the zero track) are the same as those in regard to the zero track, the FDC erroneously judges the −4 track as the zero track, and attempts to effect a control to move the magnetic head to the position of the minus four (−4) track.

There is a possibility that such an erroneously movement of the magnetic head results in the FDD being out of order. For preventing this out of order condition, conventional FDDs are provided with a stopper in the vicinity of the minus two (−2) track which is located radially inside of the minus four (−4) track.

The provision of such a stopper can prevent the magnetic head from moving toward a track positioned radially outward of the zero track. Accordingly, by exciting the stepping motor at the time when the magnetic head has been stopped to allow the excitation condition of the stepping motor to be in correspondence with that of the zero track (H·H condition as shown in FIG. 4), the magnetic head is made to return to the true zero track position. The conventional FDD necessarily requires a stopper in order to accomplish return of the magnetic head to the zero track in a stabilized manner.

In recent years, there has been developed, for use in magnetic recording and/or reproducing apparatus, an automatic return-to-zero (ARTZ) system for returning a magnetic head to the zero track position of a disk. The ARTZ system does not necessitate the provision of a stopper as previously mentioned, and therefore results in a reduction of the number of steps and cost of manufacturing recording and/or reproducing apparatus.

The operation of returning the magnetic head to the zero track position in accordance with this system is effected as described below.

Initially, after the apparatus is powered on, an internal controller (internal to the FDD) becomes operative to detect an output of a track zero position sensor. In the case where the magnetic head is positioned at a track radially inward of the zero track and the track position sensor, has an output of a high level (see FIG. 4), the internal controller of the FDD becomes operative to move the magnetic head toward the radially outward direction, and stops the movement of the magnetic head upon recognition of the position thereof on the basis of an output from the track position sensor and an excitation condition of a stepping motor.

On the other hand, in the case where the magnetic head is positioned at a track which is radially outside of the zero track (including a radially inside track extremely close to the zero track) and the track zero position sensor has an output of low level, the internal controller becomes operative to move the magnetic head in a radially inward direction until an output from the track position sensor shifts to the high level, thereafter moving the magnetic head in a radially outward direction and stopping the movement of the magnetic head upon recognition of the position thereof on the basis of an output from the track position sensor and the excitation condition of the stepping motor in the same manner stated above.

Thus, in accordance with the above-mentioned ARTZ system, there is no possibility that the magnetic head will attempt to return to the zero track by moving in a direction radially outward beyond the zero track regardless of the initial position of the magnetic head. Because no possibility of erroneous movement exists, there is no need for the provision of a stopper.

There is a problem however, when an FDD having the above-mentioned ARTZ system is utilized in connection with one of the recently developed battery-driven portable computers. Namely, when power is on, the internal controller of the FDD becomes operative to return a magnetic head to the position of a zero track independent of the track position sensor and the excitation condition of the stepping motor. For this reason, a current which is not under control of the system will flow in the FDD. When the system is powered on, there are instances where devices other than the FDD (e.g. a printer device, etc.) are to be operative while the FDD remains inoperative. But, in the case where a current which is not under control of the system flows through the FDD, the FDD remains operative and there is the possibility that power consumption of the entire system will exceed the power output of the battery. Excess consumption is most likely when plural sets of disk drive (multiple FDDs) are used.

Since the apparatus utilizing the ARTZ system cannot be employed in the battery-driven portable computer, it has been necessary to employ the above-mentioned apparatus with the provision of a stopper.

SUMMARY OF THE INVENTION

Accordingly, an object of the present invention is to provide a magnetic recording and/or reproducing apparatus which returns a magnetics head to the zero track position in a stabilized manner without using a stopper and is, especially for use in battery-driven portable computers. The apparatus is specifically configured to prevent a current which is not under control of the system from flowing when the apparatus is powered on.

An additional object of the present invention is to provide a magnetic recording and/or reproducing apparatus wherein power consumption of the apparatus is not caused to exceed the power output of the battery by flow of a current to the disk drives of the apparatus.

DETAILED DESCRIPTION OF THE PREFERRED EMBODIMENT

The present invention is described in detail below in connection with a preferred embodiment shown in FIGS. 1-4.

Figure 1:
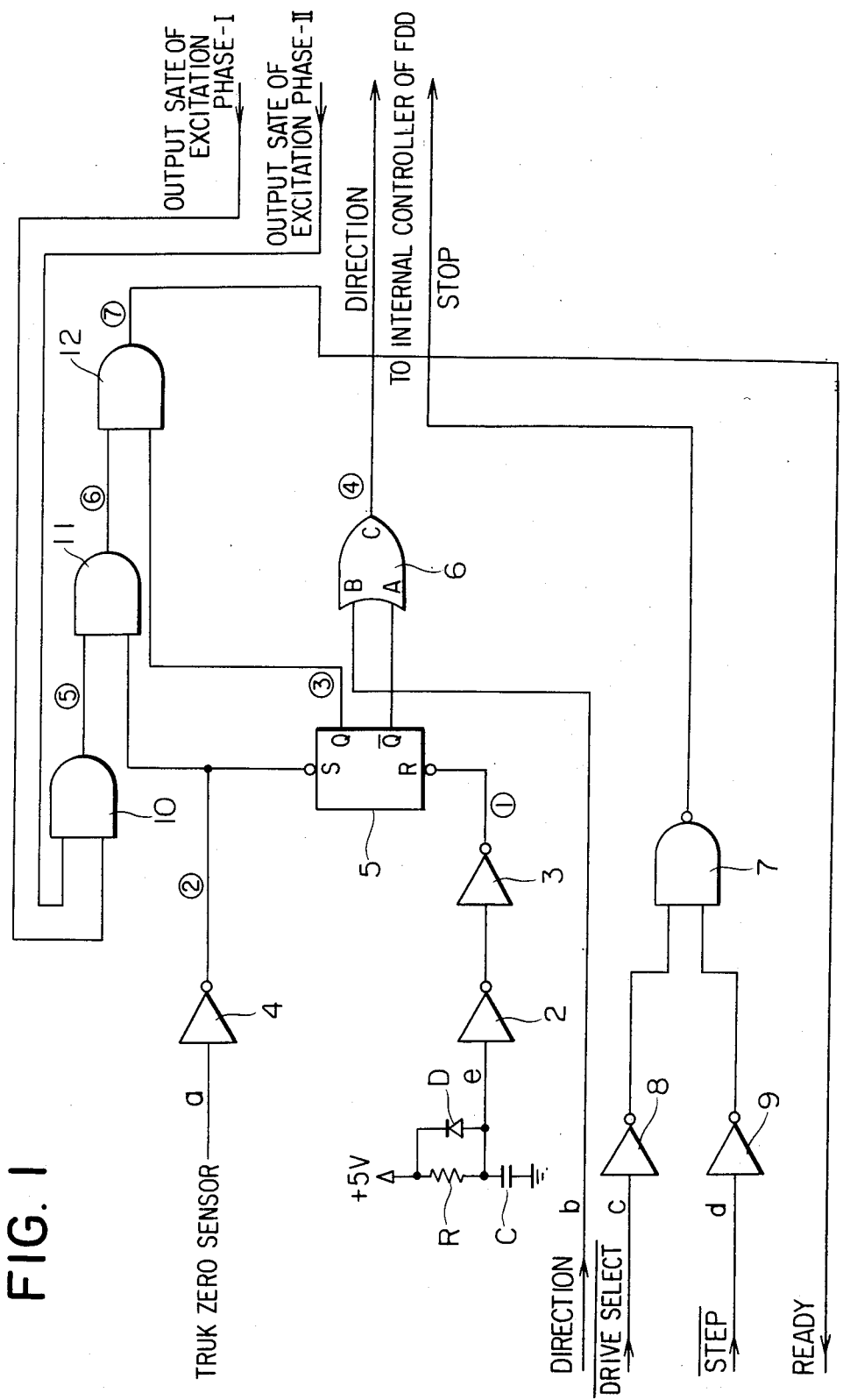
FIG. 1 is a circuit diagram illustrating an embodiment of a floppy disk drive circuit employed in the present invention.

Referring to FIG. 1, there is shown an embodiment of a flexible disk drive (FDD) circuit employed in the present invention.

The FDD circuit comprises a power on reset circuit 1 comprising a resistor R having one end connected to a power supply terminal (having a potential of, for example +5 volts), a capacitor C connected between the other end of the resistor R and ground, a diode D connected in parallel with the resistor R, and Schmitt trigger type inverters (NOT gates) 2, 3 and 4, (hereinafter referred to simply as "inverters").

An output of power on reset circuit 1 is input to reset input terminal R of a R-S flip-flop 5 through inverters 2 and 3. An output signal a from a track position sensor (not shown) is input to inverter 4. An output of inverter 4 is input to a set input terminal S of R-S flip-flop 5.

The operation of R-S flip-flop 5 is as follows: When inverter 3 produces an output of low level and inverter 4 produces an output of high level, R-S flip-flop 5 is in a reset state and outputs a signal of low level from an output terminal $\overline{Q}$. Further, when inverter 3 produces an output of high level and inverter 4 produces an output of low level, R-S flip-flop 5 is in a set state and outputs a signal of low level from the output terminal $\overline{Q}$. Furthermore, when both inverters 3 and 4 produce output of high level, R-S flip-flop 5 is maintained at a previous state. In the reset state, i.e., when output terminal $\overline{Q}$ has an output signal of high level, a signal of low level is produced from output terminal Q, while in the set state, i.e., when output terminal $\overline{Q}$ has an output signal of low level, a signal of high level is produced from output terminal Q.

An output from the output terminal $\overline{Q}$ of R-S flip-flop 5 is input to one input terminal A of the OR gate 6, and a direction signal b fed from a FDC is input to the other input terminal B of the OR gate 6. The OR gate 6 has an output terminal C connected to a magnetic head moving mechanism (not shown) through an internal controller internal to the FDD circuit. Thus, a direction signal, for controlling movement of a magnetic head, is output from output terminal C to the magnetic head moving mechanism. The FDD circuit further comprises a NAND gate 7. A drive select signal c is input to NAND gate 7 from a flexible disk controller (FDC) through an inverter 8. A step pulse signal d is input to NAND gate 7 from the FDC through inverter 9. NAND gate 7 has an output terminal connected to the magnetic head moving mechanism through the internal controller of the FDD circuit to output a step pulse signal to a stepping motor provided as part of the magnetic head moving mechanism.

In the present embodiment of the invention, the movement of the magnetic head is as follows: When OR gate 6 produces a signal of high level as the direction signal from the output terminal C, the magnetic head moves inward radially, across the magnetic disk in accordance with the step pulse signal output from NAND gate 7. In contrast, when OR gate 6 produces a signal of low level as the direction signal from output terminal C, the magnetic head moves outward radially across the magnetic disk in accordance with the step pulse signal output therefrom.

The reason why inverters of Schmitt trigger type are used in this embodiment is that an erroneous operation due to noise of chattering can be reduced because of the large hysteresis and excellent wave-shaping effects of Schmitt trigger inverters.

The FDD circuit further comprises a ready signal output circuit comprising AND gates 10, 11 and 12. The ready signal output circuit is operative to produce a ready signal indicating that the magnetic head is positioned on the zero track. The AND gate 10 has two input terminals for inputting two excitation condition outputs of the stepping motor, and has an output connected to one input terminal of AND gate 11. An output from the inverter 4 is input to the other input terminal of AND gate 11. An output from AND gate 11 is input to one input terminal of AND gate 12. An output signal from output terminal Q of R-S flip-flop 5 is input to the other input terminal of AND gate 12. The output of AND gate 12 is a ready signal indicating that the magnetic head is positioned on the zero track.

Accordingly, in this embodiment, only in the case where outputs of both excitation condition outputs of the stepping motor are at the high level, (see FIG. 4) where an output of the track position sensor is at the low level, and where power on reset circuit 1 produces an output of low level from the Q output terminal, is a ready signal output from the ready signal output circuit.

The operation of the FDD circuit employed in the present invention is now further described with reference of FIG. 2.

Initially, when the magnetic recording and/or reproducing apparatus is powered on, power on reset circuit 1 outputs a signal e the level of which gradually rises in accordance with a time constant T determined by resistor R, capacitor C and diode D. Thus, when output siganl e from the power on reset circuit 1 is less than a threshold level, inverter 2 outputs a signal of high level. On the other hand, when output signal e exceeds the threshold level, inverter 2 outputs a signal of low level.

Figure 2:
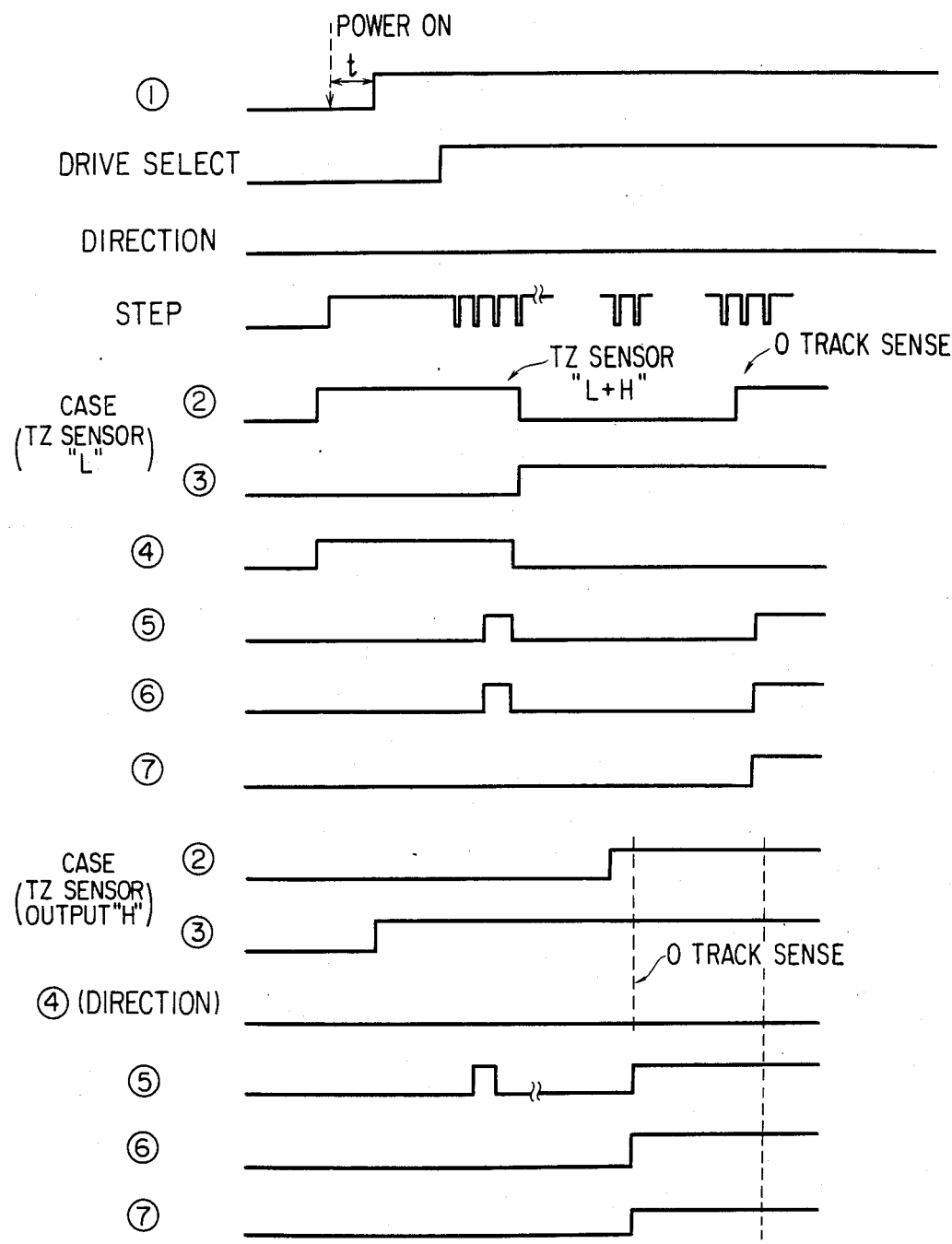
FIG. 2 is a timing chart for the floppy disk drive circuit shown in FIG. 1.

Accordingly, for a time period t (a time period slightly shorter than the time period t in a strict sense) after power is on, inverter 3 outputs a signal at the low level, and then shifts to high level (symbol 1 in FIG. 2). The R-S flip-flop 5 then shifts to reset state to output a signal of high level from output terminal $\overline{Q}$.

After power is on, the FDC attempts to return the magnetic head to the position of the zero track in accordance with an initial command. According to this, the FDC becomes operative to output direction signal b, drive select signal c and pulse signal d. At this time, direction signal b is at the low level. Further, when drive select signal c and step pulse d both have the same high level logic state which are input to NAND gate 7 through inverter 8 and 9, respectively, step pulse signal d is fed to the stepping motor provided in the magnetic head moving mechanism. At this time, the above-mentioned FDD circuit effects two different kinds of operations depending upon the initial position of the magnetic head.

A first mode of operation (mode I) of the FDD circuit is described for the situation wherein the magnetic head is positioned at a track radially outward of the zero track. This mode is also for situations where the magnetic head is positioned at a track which is radially inward but extremely close to the zero track. In such situations, since an output signal a from the track position sensor is at the low level, the output of inverter 4 is at the high level (symbol 2 in FIG. 2). R-S flip-flop 5 is thereby placed in the reset state to output a signal of high level from output terminal $\overline{Q}$, and to output a signal of low level from output terminal Q in a manner similar to the case where power is initially on (symbol 3 in FIG. 2). Accordingly, OR gate 6 becomes operative to output a signal of high level from output terminal C regardless of whether the direction signal b input from the FDC is at a high or low level (symbol 4 in FIG. 2). Thus, the magnetic head moves radially inward in accordance with the step pulse signal.

When the magnetic head moves to the proximity of the plus three (3) track, output signal a of the track sensor is above the threshold level. As a result, the inverter 4 output is at the low level. As previously mentioned, R-S flip-flop 5 is maintained at reset state from the time when power is on. However, as a result of the fact that inverter 3 output shifts to high level and the output of inverter 4 shifts to low level (symbol 2 in FIG. 2), the R-S flip-flop 5 is set to output a signal of low level from the output terminal $\overline{Q}$, thereby causing the magnetic head to move in a radial outward direction.

Subsequently, the logical state of R-S flip-flop 5 is unchanged. Accordingly, a signal of low level is continuously output from the output terminal $\overline{Q}$. Thus OR gate 6 outputs, from the output terminal c, a signal having the same logical state as that of the direction signal b which indicates that the magnetic head is to move radially outward.

On the other hand, since the magnetic head passes through the zero track in the process of moving radially inward for the case where the magnetic head is initially located radially outward of the zero track), AND circuits 10 and 11 produce signals of high leval (symbols 5 and 6 respecitvely in FIG. 2). The output of output terminal Q of R-S flip-flop 5 represents low level, and AND circuit 12 produces an output signal of low level.

As a result, the ready signal is not produced from AND circuit 12. Only in the instance when output signal a of the track position sensor represents a high level and indicates that the track position sensor senses the zero track in a situation where the magnetic head moving outward in a radial direction, does the AND gate 12 outputs the ready signal.

At this time, the internal controller of the FDD circuit becomes operative to successively deliver the step pulse signal d to the magnetic head driving mechanism. Step pulse signal d is delivered to the magnetic head driving mechanism until the output of the track zero position sensor and the excitation condition of the stepping motor are equal to those of the zero track, whereby the magnetic head moves in a radially outward direction to return to the zero track position.

Next, a second mode of operation (mode II) will be described for the situation wherein the magnetic head is positioned at a track radially inward of the zero track. In this situation, since output signal a of the track position sensor is at the high level, the output of the inverter 4 is a signal of low level. Further, R-S flip-flop 5 is set to output a signal of low level from output terminal $\overline{Q}$, and to output a signal of high level from output terminal Q (symbol 3 in FIG. 2).

Subsequently, the output state of R-S flip-flop 5 is unchanged. Accordingly, when direction signal b from the FDC is input to OR gate 6, OR gate 6 outputs a signal (of low level) having the same level as the logical level of direction signal b. Accordingly, the internal controller of the FDD circuit becomes operative to continuously deliver step pulse signal d to the magnetic head moving mechanism until the output of the track sensor shifts to low level and the excitation conditions of each of the two excitation condition become signals of high level, thereby causing the magnetic head to move radially outward to return to the zero track position.

While the magnetic head is being returned to the zero position, the possibility exists that the excitation condition of the stepping motor is coincident with the zero track. However, even if in-phase condition occurs, the ready signal is not output as long as the output of the track sensor is of a signal high level, i.e., the ready signal is output when the output of the track position sensor shifts to low level (symbols 6 and 7 in FIG. 2).

In either mode of operation (mode I or II), after the magnetic head has returned to the zero track position, the FDC may desirably control the moving direction of the magnetic head in accordance with direction signal b.

In a preferred embodiment of the invention, as described above, an R-S flip-flop is used. However, the present invention is not limited to this configuration. The same function may be realized by using another logic circuit, as for example, a J-K flip-flop. Further, the OR gate used (OR gate 6) may be replaced by, for example, a NOR gate combined with an inverter.

In addition, in the embodiment described above, the present invention has utilized actual logic circuitry, i.e., hardware.

However, the present invention may be configured in other ways by using, for example, firmware and by incorporating a microcomputer withing the FDD.

Figure 3:
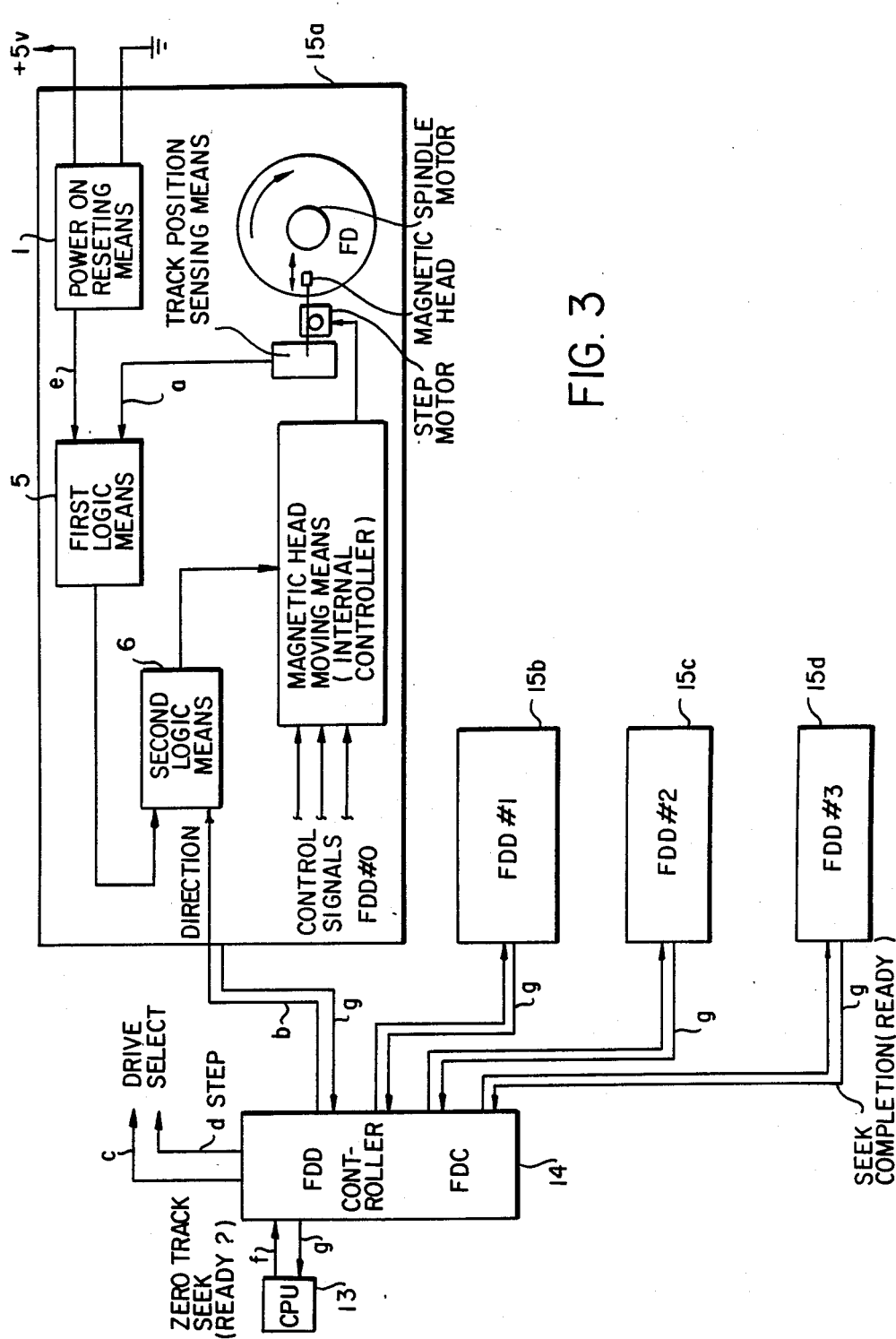
FIG. 3 is a block diagram illustrating a control system of the floppy disk of the present invention.
Figure 4:
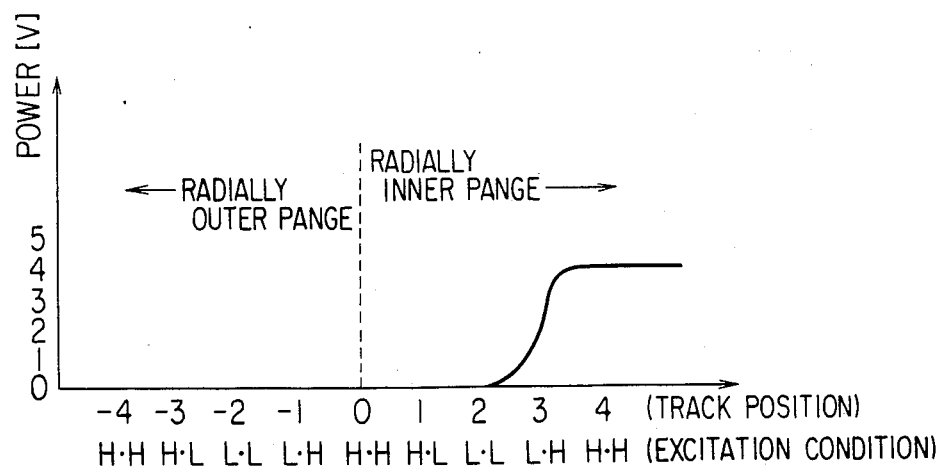
FIG. 4 is a graph showing signal output states of a track position sensor employed in the present invention.

FIG. 3 illustrates a control system provided with a plurality of FDDs each including the above-mentioned circuit.

When a command f for seeking the zero track is output from a CPU 13 to an FDC 14, FDC 14 becomes operative to output a step pulse signal d only to an FDD or FDDs selected from among FDDs 15a to 15d. Command f effects a seek operation only for selected FDDs. After this seek operation is completed, each of the designated FDDs outputs a seek completion signal g to CPU 13 via FDC 14. CPU 13 judges the ready condition on the basis of a ready signal indicating that the magnetic head is positioned at the zero track, a signal indicating that a spindle motor rotates at a constant speed, and a signal indicating that each of FDD is correctly disgnated by the corresponding drive select signal c.

As described above, the floppy disk drive according to the present invention makes it possible to return the magnetic head to the position of the zero track without using a stopper mechanism regardless of the initial position of the magnetic head. Further, this operation is effected only by a device or devices selected by the FDC. Accordingly, the present invention, even when applied to a floppy disk drive for use in a battery driven portable computer, eliminates the possibility that power dissipation of the entire system will exceed the allowable power of the battery.

We claim:

1. An apparatus for moving a magnetic head, which is used in transferring data between an information system and an external magnetic disk, in a radial direction to a reference track of said magnetic disk in accordance with a direction signal from a magnetic disk controller, said apparatus comprising:
   (a) track position sensing means for sensing a track position of said magnetic head with respect to said magnetic disk, said track position sensing means having an output indicating whether said magnetic head is positioned radially inward or outward of positions within a predetermined vicinity of said reference track;
   (b) reset means for providing a set signal for a predetermined time commencing when a potential is applied to said reset means;
   (c) first logic means responsive to said output of said track position sensing means and said set signal for providing a first binary control signal for use in selecting the direction of movement of said magnetic head;
   (d) second logic means responsive to said direction signal from said magnetic disk controller and said first binary control signal for providing a second binary control signal operative to set the direction of movement for said magnetic head, said second binary signal being operative to set a direction of movement in accordance with said direction signal from said magnetic disk controller when said first binary control signal is in a first binary state, and being operative to set a direction of movement in accordance with a predetermined direction when said first binary control signal is in a second binary state; and
   (e) means for moving said magnetic head in a radial direction in accordance with said second binary control signal.

2. The apparatus for moving a magnetic head of claim 1, wherein said first logic means comprises an R-S flip-flop device.

3. The apparatus for moving a magnetic head of claim 1, wherein said second logic means comprises an OR circuit device.

4. The apparatus for moving a magnetic head of claim 1, wherein power for said apparatus is supplied by a direct current power source.

* * * * *